Aug. 19, 1969    P. W. STRIPP ET AL    3,461,990
TRAILER LUBRICATION SYSTEMS

Filed Jan. 17, 1967    5 Sheets-Sheet 4

INVENTORS
PETER WILLIAM STRIPP
REGINALD RALPH MAY
By Mason, Kolehmainen, Rathburn & Wyss
ATTORNEYS

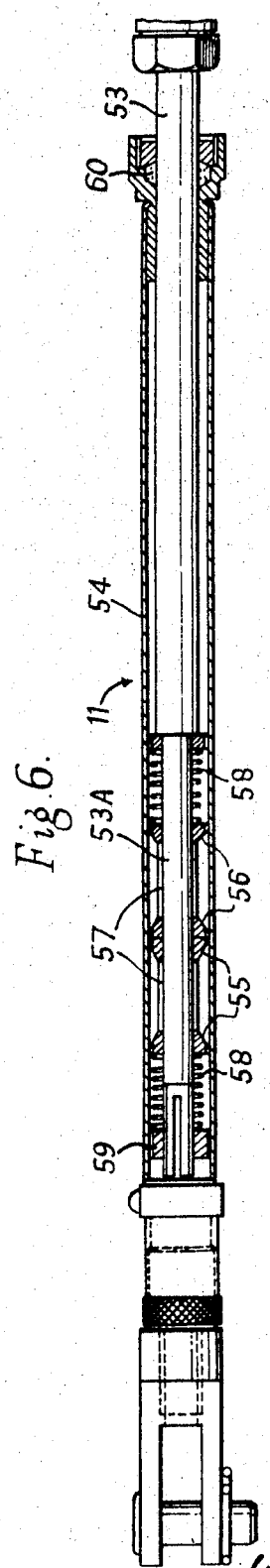
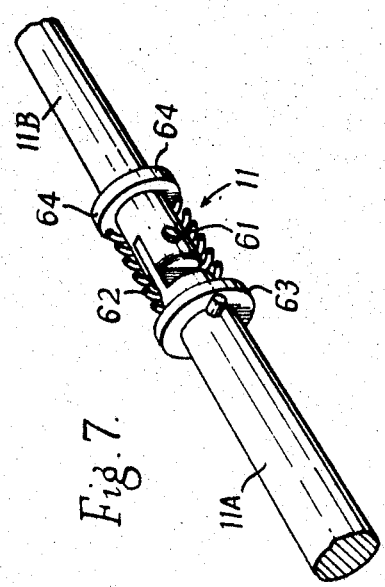

United States Patent Office 3,461,990
Patented Aug. 19, 1969

3,461,990
TRAILER LUBRICATION SYSTEMS
Peter William Stripp and Reginald Ralph May, Plymouth, Devon, England, assignors to Tecalemit (Engineering) Limited, Plymouth, Devon, England
Filed Jan. 17, 1967, Ser. No. 609,847
Claims priority, application Great Britain, Jan. 17, 1966, 2,150/66
Int. Cl. F16n 13/18; F16f 1/24; F04b 19/22
U.S. Cl. 184—7
5 Claims

ABSTRACT OF THE DISCLOSURE

A vehicle lubrication system comprises a lubricant pump mounted or adapted to be mounted on a vehicle and an operating member which operates the pump and is movable in response to movements of the vehicle or a part thereof, such as an axle.

---

Figure 1:
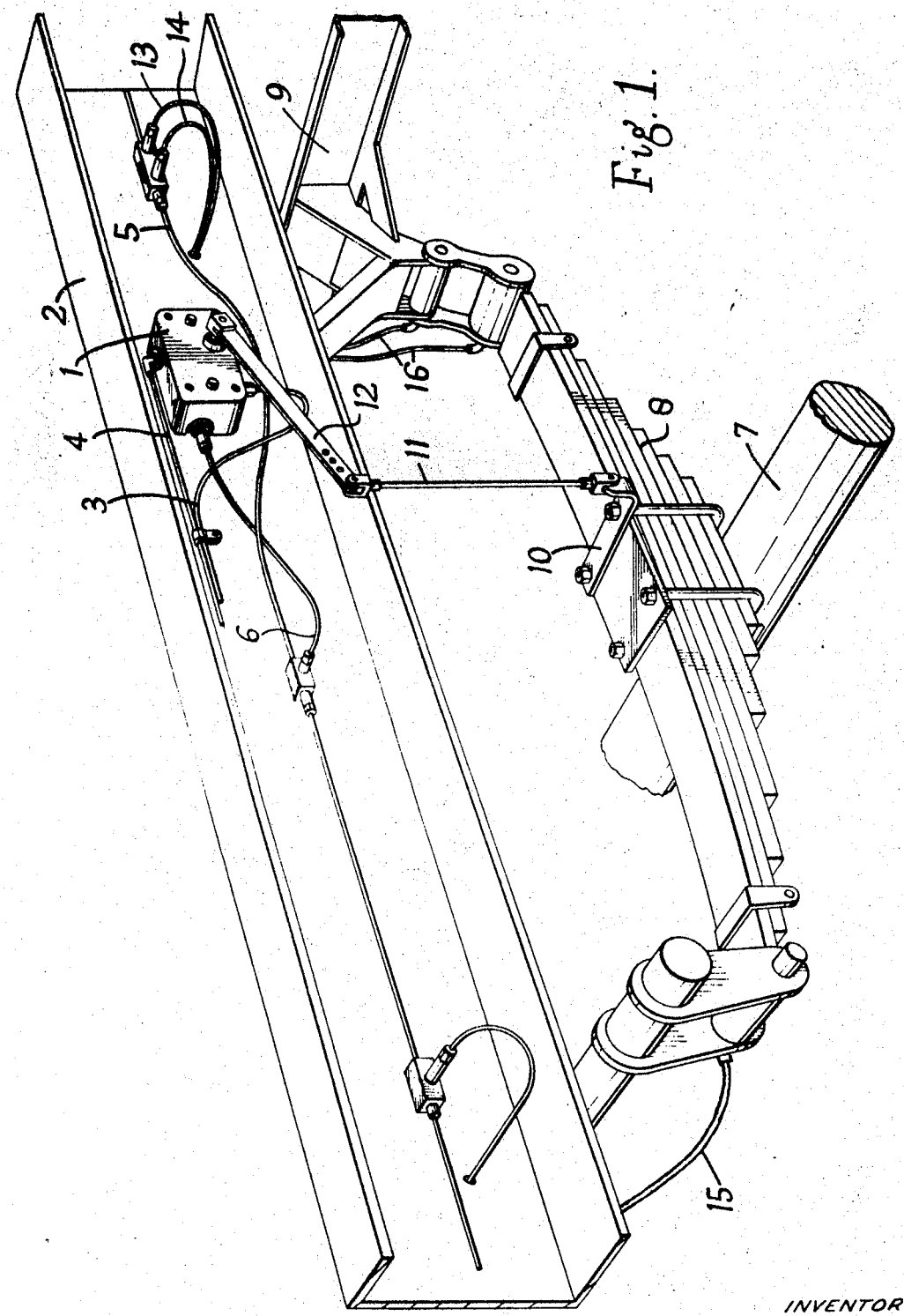

This invention relates to lubrication systems for vehicles and it is more particularly concerned with the provision of a lubrication system which is designed for and which is intended for use on trailers.

In the past two methods have frequently been used for lubricating trailers.

In the first method the trailer is provided with its own hand-operated lubrication system, which latter might be any one of a number of known systems. Thus lubrication might be effected at individual points, or the lubricant could be supplied from a central unit mounted on or connected to the trailer.

In the second method, the trailer is provided with a secondary lubrication system which is operated from the towing vehicle, but this necessitates some form of pipe coupling being provided between the towing vehicle and the trailer. In this case, moreover, difficulties are often encountered if a trailer which is equipped for automatic lubrication from the vehicle is used with a towing vehicle which is not equipped for this.

It is, accordingly, the principal object of the present invention to provide a lubrication system which can be fitted to a trailer or like vehicle and which will operate automatically without any special connection having to be provided between the towing vehicle and the trailer and without any special equipment having to be provided on the towing vehicle.

According to the invention a vehicle lubrication system comprises a lubricant pump mounted or adapted to be mounted on a vehicle and an operating member which operates the pump and movable in response to movements of the vehicle or a part thereof.

The operating member is operable by relative movement of the vehicle chassis and an axle of the vehicle. Thus the vertical movements of the axle as the vehicle moves can be translated into a pumping action of the pump. The operating member may be a pivoted arm.

The pump may also be operated by rotation of a wheel of the vehicle. The pump may be of any suitable type and may be connected to the lubrication points in any suitable way.

The frequency and amounts of the movements of the axle relatively to the body or frame of the trailer will depend a great deal on the nature of the road and on the speed of the trailer. The fact that the pump will normally be operated more frequently when the trailer is being driven over rough roads and its suspension system is in greater need of lubrication is a useful advantage which is provided by the present invention. The wide variations in the amounts of movement of the wheels and axle does, however, introduce certain difficulties.

The system according to the invention allows these difficulties to be mitigated to some extent by including embodiments which allow the axle to continue its movement after the operating member has reached the limit of its travel and allow the operating member to have an excessive movement without the pump delivering an excessive amount of lubricant.

The system according to the invention is applicable to all types of trailer and semi-trailer which may include any form of spring or equivalent suspension. The system may be regarded as a self-contained system which allows a towed vehicle to be provided with its separate lubrication system. A semi-trailer having a conventional chassis frame with a single axle towards its rear end and a coupling at its forward end where it can be coupled to a towing vehicle will form a particular application of the system.

Figure 2:
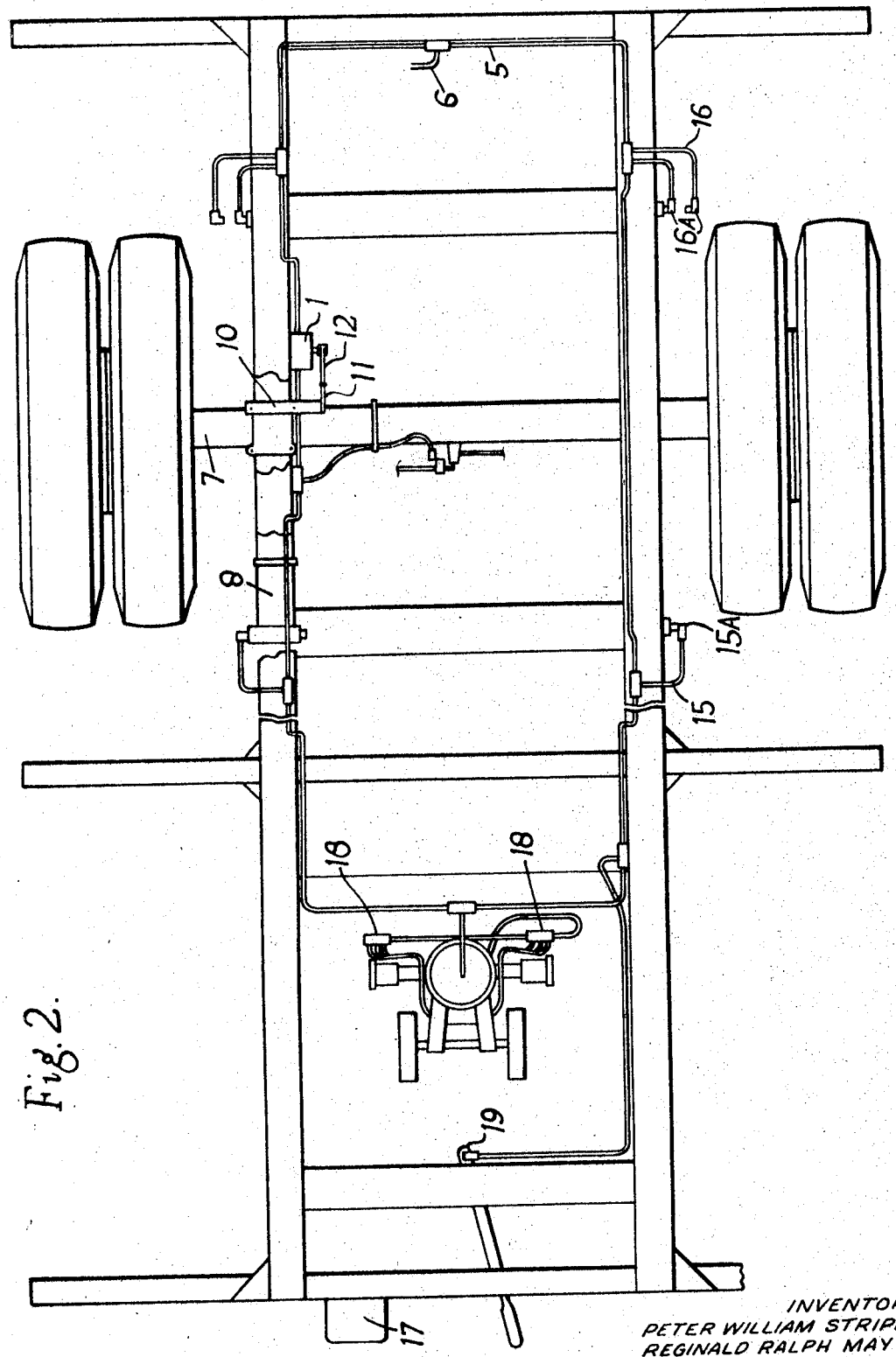
Figure 3:
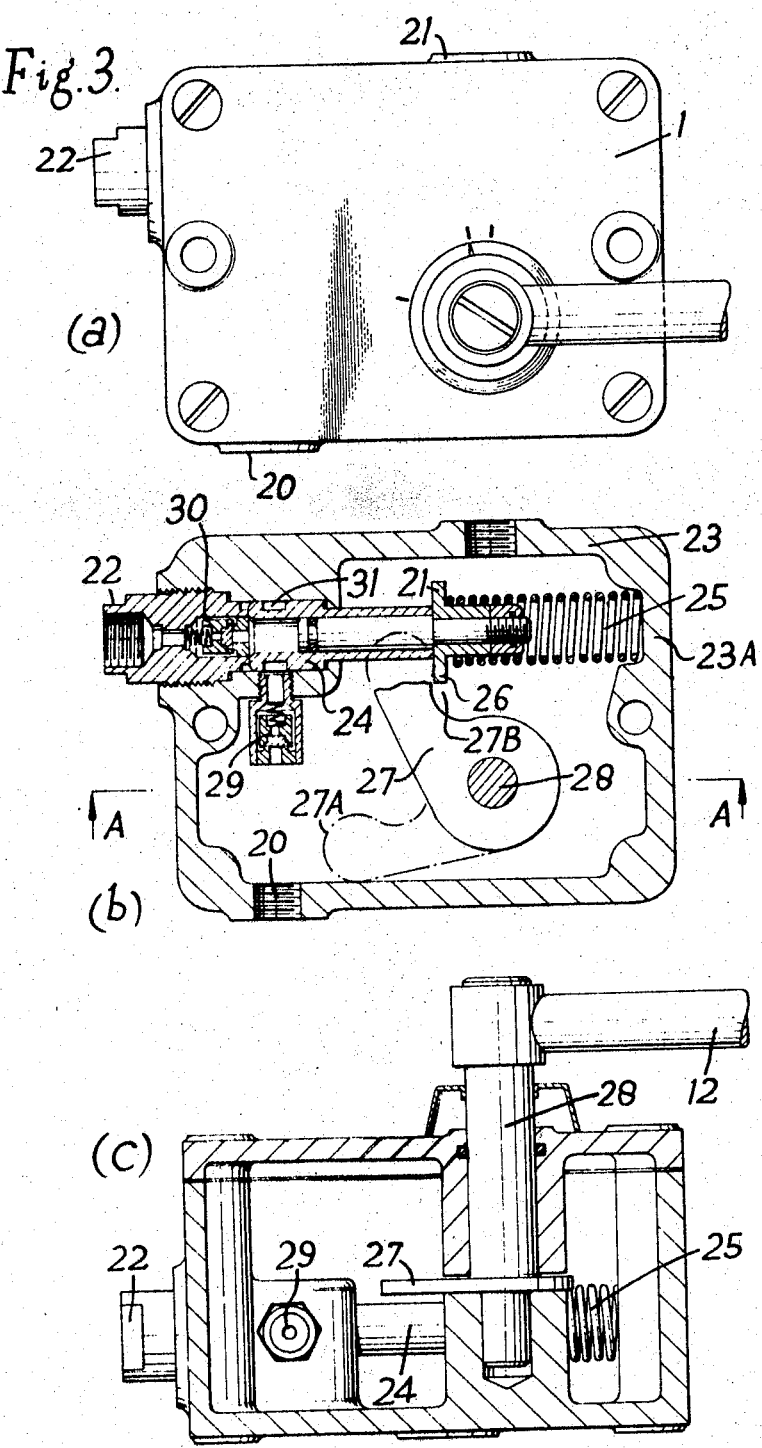
Figure 4:
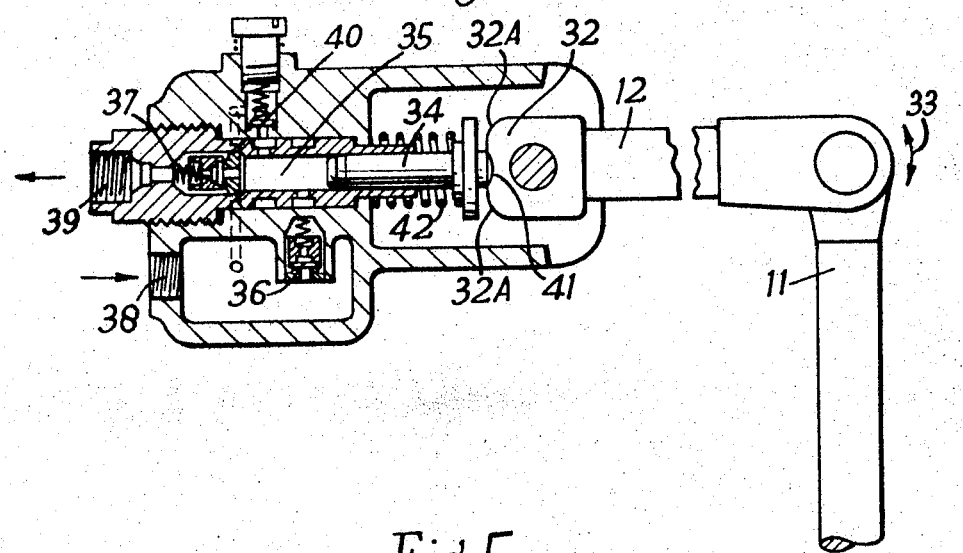
Figure 5:
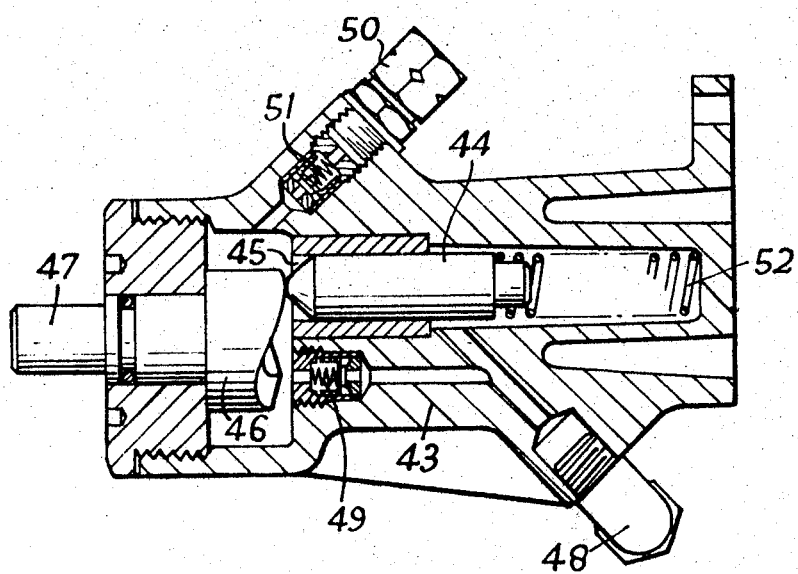

Embodiments of the system according to the invention will now be described by way of example with reference to the accompanying diagrammatic drawings in which:

FIGURE 1 shows a view perspective of the lubrication system in position;
FIGURE 2 shows a plan view of the system in position;
FIGURE 3 shows views of a lubrication pump used in the system;
FIGURE 4 shows a sectional view of a second lubrication pump used in the system;
FIGURE 5 shows a sectional view of a third lubrication pump used in the system;
FIGURE 6 shows a telescopic connecting link; and
FIGURE 7 shows a lost motion connecting link.

A lubricating pump 1 is attached to a trailer chassis member 2 together with the associated lubrication pipes.

A wheeled axle 7 is carried on a leaf spring 8 of conventional construction which is attached to another chassis member 9. The leaf spring 8 has a spring bracket 10 attached to its upper surface to which bracket is pivotally connected link 11 which is pivoted with an arm 12.

Vertical oscillations of the arm 12 through a small angle cause opeartion of the pump 1. Pipe 3 leads oil from a reservoir which is disposed on a level above the pump and pipe 4 is an oil vent return to the reservoir.

The pump 1 supplies oil through a feed pipe 6 to a ring main 5 which supplies oil to take-off pipes 13, 14, 15, 16. Other take-off pipes are not shown on the diagram and the take-off pipes may be of rigid or flexible construction depending on the position of the lubrication point they are supplying.

As the axle is moved up and down due to movement of the wheels along a surface the linkage 11 is moved vertically and imparts an oscillatory motion to the arm 12. Thus relative motion between the trailer and the axle causes oil to be supplied to lubrication points on the trailer.

In FIG. 2 it is seen that the oil tank 17 may be mounted some distance from the pump and the pump 1 supplies a series of lubrication points through the feed pipe 6 and ring main 5. The points supplied are front spring pin 15, top and bottom spring shackle pins 16, undercarriage manifold blocks 18 and handbrake 19.

In FIG. 3a a general front view of the pump 1 is shown with an inlet 20 from the reservoir and a vent return 21 to the reservoir. An outlet 22 connects to the feed pipe 6 which joins the ring main 5. A front view of the pump with the cover removed is shown in FIGURE 3b. The casing 23 contains a piston 24 movable in a cylinder 31 and biased away from a wall 23A of the casing by a spring 25 which acts on a flange 26 of the piston. A rocker arm 27 carried on a shaft 28 extending across the casing, and journalled in the side walls thereof, contacts the flange 26 and is movable to compress the spring 26. Non-return valves 29, 30 are disposed between the cylinder 31 and the inlet 20 and the outlet 21 respectively. The extremes of movement of the rocker arm 27 are shown by the positions 27A and 27B. In FIG. 3c is shown a sectional view on the line A—A of FIG. 3b and the arm 12 is seen connected to the shaft 28.

Vertical oscillation of the arm 12 thus causes movements of the rocker arm 27 which compress the spring 25 and move the piston 24 thus pumping oil from the inlet 20 to the outlet 22 through the non-return valves. The pumping strokes of the piston 24 being carried out by the spring 25 and the return strokes by the rocker arm.

As has been mentioned previously the movement of the axle will be determined mainly by the nature of the road and the speed of the trailer. It is desirable for the pump to be arranged to supply not less than the minimum amount of lubricant while the trailer is used on ordinary roads but on the other hand means must be provided to prevent damage to the mechanism. Also excessive movement of the axle will increase the supply of oil and lead to an excessive use of oil on bad roads or over rough country.

Excessive movement of the connecting link can be allowed for within the pump as shown in FIGURE 4. The connecting link 11 is pivotally connected to the arm 12 which carries a cam 32 at the end disposed in the pump body. The arm is movable in directions shown by the arrow 33. The cam 32 cooperates with a pump stud 41 which is biased against the cam 32 by a spring 42. Movement of the arm 12 moves the piston 34 within the cylinder 35 and oil is drawn in through the inlet 38 and out through the outlet 39 via the non-return valves 36 and 37. A feed adjustment screw 40 allows the amount of oil delivered at each stroke to be controlled.

It will be seen that excessive movement of the arm will move a cam rise 32A past the piston stud 41 which will then move to draw the piston from the cylinder and not farther into the cylinder.

A multilobe cam pump is shown in FIGURE 5 in section. The pump casing 43 contains a piston 44 movable within a cylinder 45 and biassed by a spring 52 against a multilobe cam 46. The cam is rotatable by the shaft 47 to which is attached the arm 12 (which is not shown). Oscillatory rotation of the cam 46 causes the piston to move and pump oil from the inlet 48 through the non-return valves 49 and 51 and out through the outlet 50. The pump may also be fitted with a feed adjustment screw if desired. The lobes of the cam may be of differing heights so that various delivery rates of oil can be obtained by adjusting the angular position of the arm 12 in relation to the cam. As in the previous pump excessive movement of the arm does not cause excessive movement of the piston. The casing may be formed as a single casting having an open end into which the end of the arm enters and in which it operates on the end of the piston to effect a pump stroke, return or suction strokes being effected by means of the spring.

The feed adjustment screw can be used to adjust the pump for the number of points to be lubricated and also the amount of oil to be delivered at each stroke.

Damage to the pump or excessive supply of oil due to excessive movement of the axle can also be alleviated by providing a safety arrangement between the axle and the pump. Although such a safety arrangement can also be positioned between the operating arm and the pump shaft or between the pump shaft and the rocker arm.

FIGURE 6 shows a telescopic connecting link indicated generally at 11 which may be connected in pivotal relationship between an axle spring and an operating arm. The link comprises an inner member 53 movable within a cylinder member 54 and supported at the open end thereof by a bearing 60. A smaller diameter part 53A of the inner member carries a series of rings 55, 56 or collets of frictional material of frusto-conical shape and arranged in spaced pairs which rings contact the inner surface of the cylinder 54. The rings of each pair are spaced by sleeves 57 and the frictional material is compressed and forced against the wall of the member 54 by the action of compression springs 58. The forces exerted by the springs on the rings can be adjusted by movement of a nut 59 screwed on the end of the inner member and abutting one of the springs.

During normal running of the vehicle the link 11 transmits motion of the axle spring to the operating arm but any excessive movement of the axle will overcome the frictional force between the rings and the cylinder member. The two members of the link will then telescope so that the excessive motion is not transmitted to the operating arm.

In FIGURE 7 there is shown a further embodiment of a connecting link which does not allow excessive motion to be transmitted to the operating arm. The link generally indicated at 11 comprises two parts 11A and 11B pivotally connected by a pin 61 and each carrying a flange 63, 64. A compression spring 62 is positioned to abut the flanges. The link transmits movement to the operating arm from the axle because the spring closely positioned around the surfaces of the parts 11A and 11B does not allow them to pivot about the pin 61. If, however, the operating arm reaches a limit to its movement the force on the pivot will displace the parts 11A and 11B to angular configuration against the force of the spring which is deformed. When the axle returns to a non-excessive position the spring regains its cylindrical shape forces the parts 11A and 11B into linear relationship.

The invention thus provides a lubrication system which is usable in a self-contained manner and is of flexible operation, being usable on rough roads or terrain as well as on relatively smooth roads.

What we claim is:

1. In a lubrication system in a vehicle having a frame and suspension system, in combination a lubricant pump mounted on the frame, a lubricant reservoir and lubrication points, pipes connecting the pump, reservoir and points, an operating member comprising an operating arm pivoted on said pump and pivotally connected to an operating linkage connected with the suspension system, said pump including a bore and a piston slidable therein, a bias member acting on said piston, said operating arm cooperating separably with said piston to move same against bias member, whereby vertical movement of the suspension system relative to the vehicle frame causes the operating arm to pivot about the pump and operate same.

2. A system according to claim 1 including a lost motion device interposed between the pump and vehicle suspension to prevent excess lubrication when the vehicle is driven over rough roads.

3. A system according to claim 1, further comprising cam surfaces through which cooperation of the pump and operating arm is performed.

4. A system according to claim 1 wherein the operating linkage comprises in combination a cylindrical member and a rod like inner member, high friction material between and contacting the members to allow mutual movement under a force sufficient to overcome frictional resistance.

5. A system according to claim 1 wherein the operating linkage comprises in combination two parts pivotally connected with a deformable helical restoring spring positioned over the pivot.

References Cited

UNITED STATES PATENTS

| | | |
|---|---|---|
| 1,622,027 | 3/1927 | Couchman et al. |
| 1,623,240 | 4/1927 | Goodrich. |
| 2,643,109 | 6/1953 | Wood _____ 267—69 X |
| 2,951,556 | 9/1960 | Jackson et al. _____ 103—153 X |
| 3,233,550 | 2/1966 | Smith _____ 103—173 X |

HOUSTON S. BELL, Jr., Primary Examiner

U.S. Cl. X.R.

184—37, 45; 267—70; 103—153